Sept. 20, 1960  F. AGOLIATI ET AL  2,953,154
CUTOFF VALVE
Filed Dec. 30, 1957
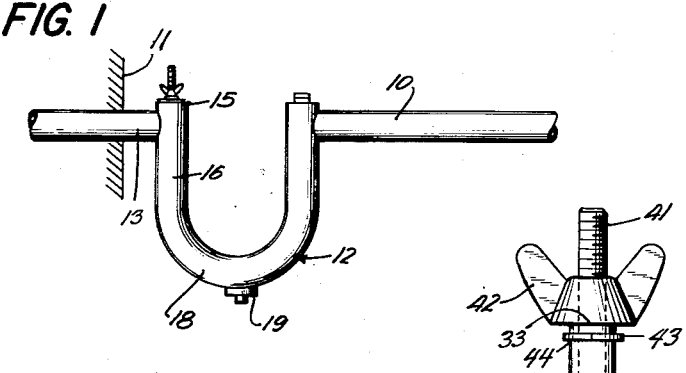
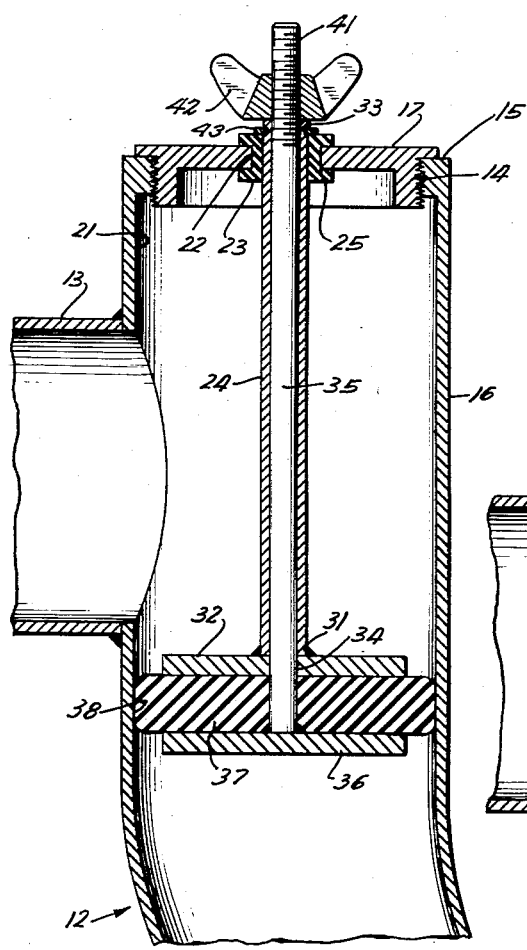
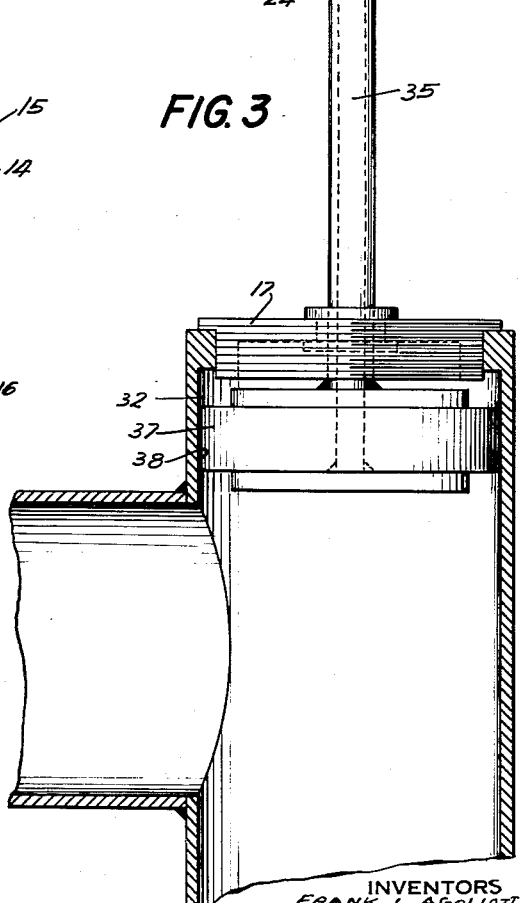
INVENTORS
FRANK L. AGOLIATI
IRVING KOSOW
JULIUS U. SIEGEL
BY
ATTORNEYS United States Patent Office 2,953,154
Patented Sept. 20, 1960

2,953,154
CUTOFF VALVE
Frank Agoliati, 90 Ridge Ave.; Irving L. Kosow, 81 Park Hill Court; and Julius U. Siegel, 65 Park Hill Court, all of Staten Island, N.Y.

Filed Dec. 30, 1957, Ser. No. 705,869

2 Claims. (Cl. 137—247.13)

As conducive to an understanding of the invention, it is noted that the internal sewage system of private houses, apartment houses and factories which includes the various toilets, sinks and other drainage outlets, normally discharges through a common line which has a main U-shaped gas trap, generally located at the basement level, into the main or external sewage system in the street.

Where there is no cutoff valve located in the house or factory that is readily accessible to the occupant, and should there be flooding of the external sewage system such as by excessive rain or the like, as the water level may rise above the level of the basement of the house or factory, the resultant pressure may cause the external sewage system to flow back through the main gas trap with the result that sewage may discharge and overflow through the toilets, sinks and drainage outlets in the basement and perhaps at higher levels in the house or factory with resultant destruction of property and inconvenience to the occupants.

It is accordingly among the objects of the invention to provide a valve that has but few relatively inexpensive parts and may be fabricated at low cost, that may readily be incorporated into the main gas trap of the conventional internal sewage system of a house or factory generally without need for tools or any modification in such gas trap, which valve may normally be retained in open position for normal use of the sewage system and may readily be closed, also without the use of any tools, to cut off the internal sewage system from the external sewage system to prevent back flow with the disadvantage above set forth.

According to the invention, these objects are accomplished by the arrangement and combination of elements hereinafter described and particularly recited in the claims.

In the accompanying drawings in which are shown one or more of various possible embodiments of the several features of the invention, Fig. 1 is a fragmentary view showing the main gas trap, Fig. 2 is a detail view of the valve and a portion of the main gas trap on a greatly enlarged scale and with the valve in closed position, and Fig. 3 is a view similar to Fig. 2 with the valve in open position.

Referring now to the drawings, as illustratively shown in Fig. 1, the main sewage line 10 in the basement of a house or factory 11 is connected through a conventional U-shaped gas trap 12 and a discharge line 13 to the external sewage system located in the street. As shown in Fig. 2, the gas trap 12 has a threaded port 14 at the upper end 15 of one of the legs 16 of the U-shaped trap 12, which port provides access for cleaning of the trap and is normally closed by a plug 17. In addition, the reverse bend 18 of the trap may have a port which also is for cleaning purposes and is closed by a removable plug 19. The discharge line 13 desirably is connected to the leg 16 of the gas trap 12 at a position below the upper end 15 of said leg to define a cylindrical portion 21.

Although conventional gas traps are normally provided with the port 14, above described, if such port is not present, it may readily be formed or a gas trap utilized provided with such a port.

According to the invention, the plug 17 has a central bore 22 in which a sealing ring 23 of resilient material is positioned. An elongated sleeve 24 extends through the bore 25 of the sealing ring 23 and is slidably mounted therein with a relatively tight fit so that a dependable liquid tight seal is provided between the ring 23 and the sleeve 24.

Affixed as by welding to the lower end 31 of sleeve 24 is a circular plate 32 of diameter less than the diameter of the port 14 of the trap as is clearly shown in Fig. 2. Extending through the sleeve 24 and protruding beyond the upper end 33 thereof and through an axial opening 34 in plate 32 is a rod 35, to the lower end of which is affixed as by welding a circular plate 36 illustratively of the same diameter as plate 32. A washer 37 of resilient material which may be of rubber or synthetic material of like physical characteristics, encompasses the portion of rod 35 between the plates 32 and 36, said washer being of such diameter and shape that when compressed in the manner hereinafter described, its outer periphery 38 will snugly engage the inner surface of leg 16 of the trap as shown in Fig. 2. The upper end of the rod 35 protruding beyond the end 33 of sleeve 24 is threaded as at 41 and a wing nut 42, for example, is screwed on said threaded end 41.

The valve is normally retained in open position so that access is provided from the line 10 through the gas trap 12 to the line 13 for normal discharge of waste from the house or factory into the external sewage system. To this end, the sleeve 24 is in its uppermost position as shown in Fig. 3 and the wing nut 42 is tightened to draw the rod 35 upwardly, thereby moving the plate 36 connected thereto toward the plate 32 which is affixed to the sleeve, so that the resilient washer 37 therebetween will be compressed to urge its periphery 38 outwardly snugly to engage the cylindrical portion 21 of leg 16 of the trap. As a result, free passage will be afforded through the trap. The washer 37 in the position thus described provides an effective seal that will prevent leakage through port 14 in the event that the screw threads of port 14 are damaged or the plug 17 is defective.

In the event of a severe storm which might cause flooding of the external sewage system or if the occupant of the house or factory is away for any length of time, to eliminate possibility of backflow from the sewage system due to a sudden storm, it is merely necessary for the occupant to loosen the wing nut 42. This will cause the plate 36 to move away from the plate 32 by reason of the expansion of the compressed resilient washer 37, the periphery 38 of said washer by reason of such expansion moving away from the cylindrical portion 21 of leg 16 of the trap. Thereupon, it is merely necessary to push downwardly on the sleeve 24 which will slide through ring member 23 until the plates 32 and 36 are in alignment with the portion of leg 16 below the discharge line 13. A snap ring 43 desirably encompasses the sleeve 24 adjacent its upper end 33 and is positioned in an annular groove 44 in said sleeve so that when it abuts against the sealing ring 23 it will limit the downward movement of said sleeve properly to position the washer 37. At this time the wing nut 42 is again tightened and it will react against the end 33 of sleeve 23 to draw the rod 35 and the plate 36 affixed thereto in an upward direction compressing the resilient washer 37 against the plate 32.

Consequently, the periphery 38 of the washer 37 will snugly engage the wall of the leg 16 to provide a dependable seal which will prevent backflow from the external sewage system through the pipe 13 and the trap 12 into the basement of the house or factory. Consequently, there is no likelihood of discharge of sewage through toilets, sinks or drains located in the basement with consequent flooding of such basement with sewage waste.

As the washer 37 may be compressed to a considerable degree by the action of the plates 32 and 36, the seal effected by said washer with respect to the inner surface of leg 16 of the trap is sufficient to withstand considerable pressure far in excess of that which would be encountered by backflow in the event of overflooding of the sewage system. Hence, the simple, yet highly efficient valve above described provides a highly desirable safety feature for the house or factory.

Although the valve herein shown has been described with respect to its utility in the gas trap of a house or factory, it can also be used in any type of a piping installation where a gas trap is used, such as in industrial or commercial establishments, and in ships and the like.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. An installation of the character described, comprising a substantially U-shaped gas trap having a port at the upper end of one of the legs thereof, a discharge line leading into the said leg below the port therein, an inlet line leading into the other leg of said gas trap, a plug secured in said port, said plug having a central bore, a sleeve extending axially through said bore, said bore being of considerably greater diameter than said sleeve to permit lateral movement of the latter therein, a sealing ring in said bore encompassing said sleeve, slidably yet securely and resiliently retaining the latter in said bore to provide a fluid tight seal therebetween, said sleeve being axially aligned with the leg of said trap associated with said port, a plate affixed to the lower end of said sleeve, a rod slidably mounted in said sleeve and protruding beyond the ends thereof and extending through an axial opening in said plate, a second plate secured to the lower end of said rod, said plates being of diameter less than that of said leg of the trap and a compressible washer encompassing the portion of the rod between said plates, said washer being of diameter such that when the plates are moved toward each other the outer periphery of said washer will snugly engage the inner surface of the associated leg of the trap.

2. The combination set forth in claim 1 in which said discharge line is connected to said leg of the trap below the upper end thereof to define a cylindrical portion between the port in said leg and the discharge lines, the diameter of said cylindrical portion being substantially the same as the diameter of the portion of said leg engaged by said washer when in compressed condition.

References Cited in the file of this patent
UNITED STATES PATENTS

| | | |
|---|---|---|
| 475,546 | Du Bois | May 24, 1892 |
| 1,238,259 | Campbell | Aug. 28, 1917 |
| 2,108,068 | Larry | Feb. 15, 1938 |
| 2,213,680 | Share | Sept. 30, 1940 |
| 2,772,034 | Richmond | Nov. 27, 1956 |

FOREIGN PATENTS

| | | |
|---|---|---|
| 445,019 | Germany | June 1, 1927 |